United States Patent [19]
Buck

[11] 3,747,011

[45] July 17, 1973

[54] METAL DETECTOR INCLUDING PROXIMITY-RESPONSIVE OSCILLATOR WITH FEEDBACK-STABILIZED GAIN

[76] Inventor: Robert Buck, 47 Torkelweg, Lindau-Enzisweiler, Germany

[22] Filed: Sept. 21, 1972

[21] Appl. No.: 290,867

Related U.S. Application Data

[63] Continuation-in-part of Ser. No. 80,017, Oct. 12, 1970, abandoned.

[52] U.S. Cl. ............ 331/65, 317/146, 317/148.5 R, 324/3, 324/40, 328/5, 331/109, 331/117 R, 331/183, 340/258 C

[51] Int. Cl. ...... H01h 36/00, H03b 3/02, H03b 5/12

[58] Field of Search .................. 331/65, 109, 117 R, 331/183; 324/40, 41, 71 R, 71 SN, 3; 340/258 C, 266, 282; 328/5; 307/116; 317/146, 148.5 R, 148.5 B

[56] References Cited

UNITED STATES PATENTS

| | | | |
|---|---|---|---|
| 3,201,774 | 8/1965 | Uemura | 331/65 X |
| 3,453,532 | 7/1969 | Gardiner | 331/109 X |
| 3,555,448 | 1/1971 | Clarke, Jr. et al. | 331/65 |

*Primary Examiner*—Roy Lake
*Assistant Examiner*—Siegfried H. Grimm
*Attorney*—Karl F. Ross

[57] ABSTRACT

An electronic contactless distance indicator adapted to respond to the proximity of a metallic element has an oscillator including a main transistor with a rectified output degeneratively fed back to the input of that transistor to increase its amplification factor upon a reduction of the amplitude of the generated oscillations due to the approach of such element. The rectified voltage derived from this oscillation controls an ancillary transistor, specifically an F.E.T., in an emitter lead of the main transistor and is also fed to an indicator as a measure of the distance of the metallic element from the oscillator.

8 Claims, 2 Drawing Figures

PATENTED JUL 17 1973 3,747,011

METAL DETECTOR INCLUDING PROXIMITY-RESPONSIVE OSCILLATOR WITH FEEDBACK-STABILIZED GAIN

This application is a continuation-in-part of my copending application Ser. No. 80,017, filed Oct. 12 1970 and now abandoned.

FIELD OF THE INVENTION

My present invention relates to an electronic contactless distance indicator and, more particularly, to an electronic detector for signaling the proximity of a metallic element, e.g., in a machine tool.

BACKGROUND OF THE INVENTION

Conventional distance or proximity indicators, designed to respond to the relative movement of a part carrying the indicator and an element whose approach is to be detected, generally make use of switching devices having two operating conditions (e.g., open and closed) respectively signaling the fact that such element is or is not within a predetermined range. Systems relying on physical contact with the approaching element are, of course, prone to wear, are sensitive to mechanical fatigue, are disrupted by environmental contamination and often are triggered erroneously.

There have been proposed arrangements of the digital type which sense in a contactless manner the proximity of a metal part to the indicator. Such systems may include an oscillator, generating an output voltage which depends upon the proximity of the metal part whose spacing from the oscillator is to be gauged. As is well known, an amplifier with positive feedback having a regenerative coupling factor K and an amplification factor V will oscillate when $KV > 1$, the product KV being known as the loop gain. When, however, the approaching metal part causes a reduction in the loop gain so that $KV < 1$, the circuit ceases to oscillate. This changeover to a nonoscillating condition gives rise to an output which may be applied through a snap-action amplifier or bistable multivibrator, such as a Schmitt trigger, to an electronic switch, e.g., a transistor or a thyristor, to operate a load in the form of a counter or signaling device. By reason of the fact that such circuits are of digital character, they have found practical application only in binary (as distinct from analog) controls, i.e., controls responsive to one or another state, but have not been employed heretofore with any success in continuously operating, regulating or signaling systems.

OBJECTS OF THE INVENTION

It is, therefore, the principal object of the present invention to provide an improved electronic contactless distance indicator or gauge adapted to furnish an output capable of being used in continuous-control systems.

It is another object of the invention to provide an indicator of the character described which obviates many of the difficulties heretofore encountered with distance sensors.

Yet another object of the invention is to provide an electronic contactless device, responsive to the approach of a metal part thereto, which is capable of indicating distance with great accuracy.

My invention also aims at providing an improved sensor for the distance between a metallic element and a reference point which is of simple, economical and compact construction and safe from inadvertent operation and the deleterious effects of environmental conditions.

SUMMARY OF THE INVENTION

These objects and others which will become apparent hereinafter are attained, in accordance with the present invention, by the provision of rectifying means in the output of the oscillator, the rectified oscillator voltage being returned in a degenerative or negative feedback loop to the oscillator input; thus, in spite of a progressively decreasing loop gain in the regenerative path of the oscillator, the oscillator output is held approximately constant. The rectified oscillator voltage is a control signal representing the distance of the metal part from the oscillator.

While prior-art systems for contactless sensing of the distance of a metal part from an oscillator required the circuit to be in an oscillating state in one condition and in a nonoscillating state in another condition, to effect a response to one of these conditions, the system of the present invention provides a feedback circuit designed to maintain the oscillating condition in all operating states of the circuit. By virtue of the degenerative feedback of the rectified oscillator output, the reduction in loop gain due to the damping effect of the approaching metallic element is substantially completely compensated. Simultaneously, the magnitude of the rectified oscillator voltage fed back to provide such compensation constitutes a measure of the distance of the metal part from the oscillator.

Thus, my invention is based upon the principle that the amplitude of the generated oscillations can be maintained close to a predetermined value by compensatorily increasing the amplification factor V with increasing attenuation or damping resulting, as is well known per se, from the movement of a metal part toward the oscillator. The rectifying feedback circuit according to the invention operates therefore as a proportional controller, i.e., a controller whose effect is proportional to the output voltage of the oscillator whose magnitude varies with the proximity of the metal part and provides an analog indication of such proximity.

While the system may have various circuit configurations, I have found that best results are obtained when the negative-feed-back system includes a field-effect transistor (FET) whose channel is connected across a fixed resistor of the oscillator circuit and whose gate is energized by the rectified oscillator output, preferably via an emitter-follower transistor.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
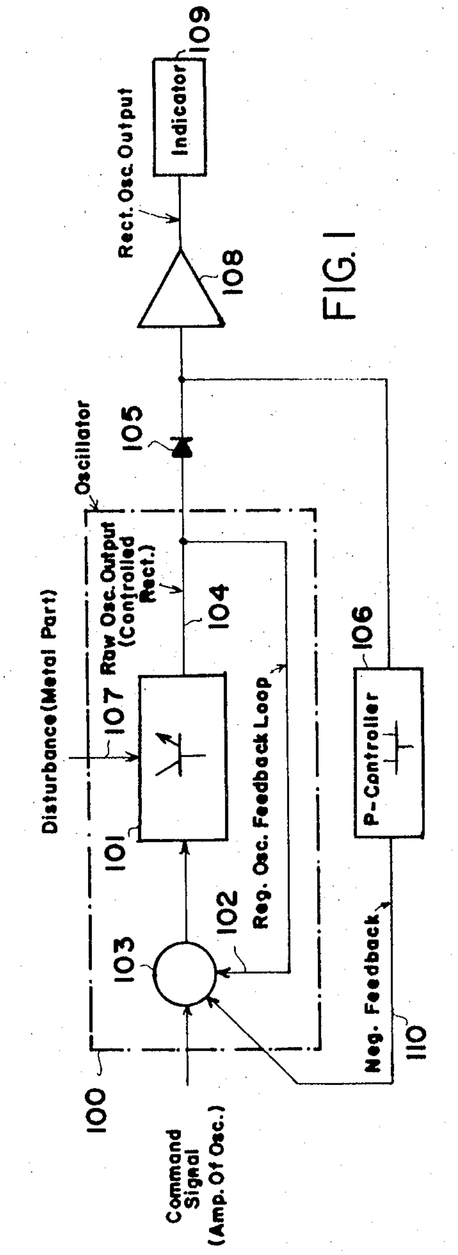
FIG. 1 is a block diagram illustrating aspects of the invention.

In FIG. 1, I show an oscillator 100 comprising an amplifier transistor 101 and a regenerative feedback loop 102 to sustain oscillation in accordance with conventional oscillator principles. For convenience of understanding, FIG. 1 is in the form of a control-system diagram and the feedback application to the amplifier has been shown to be effected through a comparator 103. The command level or signal is, of course, the loop gain of the oscillator as determined by the normal oscillator output voltage. According to the principles of this invention, the oscillator voltage is taken off at 104 as the controlled variable and is applied after rectification at 105 to a proportional controller 106 in the form of an FET as more fully described hereinafter. The rectified oscillator output, moreover, constitutes a measure of the disturbance applied at 107 in the form of a movement of a metal part toward or away from the oscillator, thereby varying the regenerative coupling factor of the latter. The output may be delivered via an amplifier 108 to an indicator 109 adapted to register continuously the relative position of the metal part (not shown) and the oscillator. The proportional controller 106 is connected in a negative-feedback loop 110 of the oscillator as previously described.

Figure 2:
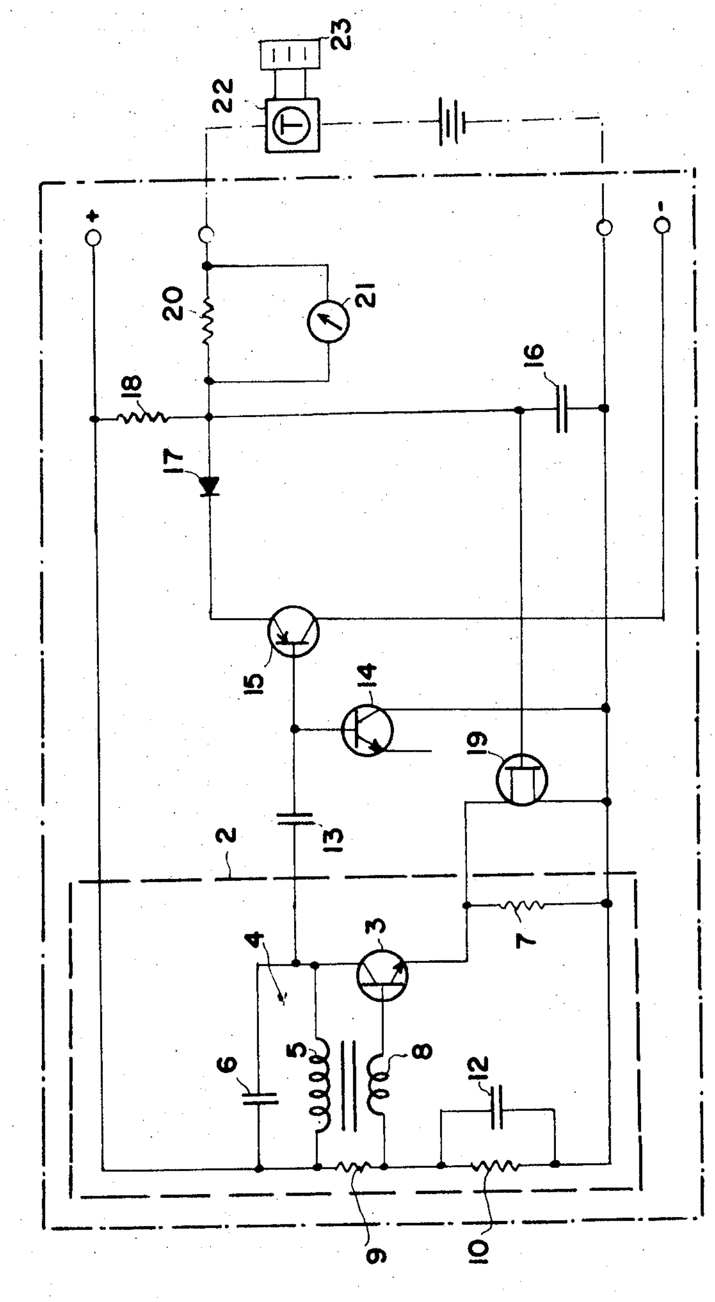
FIG. 2 is a circuit diagram of a contactless distance indicator according to the invention.

The distance indicator more fully illustrated in FIG. 2 may be mounted on a machine part, support or other structure and is responsive to the proximity of a metal part (not shown) which affects the output of an oscillator 2. The oscillator 2 comprises a main transistor 3 of the NPN type whose collector-base circuit contains a parallel-resonant network 4 including a capacitor 6 and an inductor 5 which, as a tank circuit, determines the oscillation frequency of the system. The emitter-base circuit of the transistor 3 includes a fixed emitter resistor 7 while the base lead of the transistor is provided with a feedback inductor 8 tied to the junction of a pair of voltage-divider resistors 9 and 10 connected between the parallel-resonant network 4 and the emitter resistor 7; inductor 8 forms part of the regenerative-feedback loop symbolized at 102 in FIG. 1. A shunt capacitor 12 is connected across the resistor 10.

The oscillator output voltage is derived from the collector of the transistor 3 and applied via a d.c.-blocking coupling condenser 13 to the base of a PNP transistor 15 connected in an emitter-follower circuit. A transistor 14, connected as a diode, ties the output side of the coupling condenser 13 to the junction of the emitter resistor 7 with the input resistor 10 of the oscillator, thereby applying a negative bias to the base of the emitter-follower transistor 15 whose conductivity, therefore, decreases with reduced oscillation amplitudes.

In the emitter circuit of transistor 15, I provide a storage capacitor 16 which by its charge controls an ancillary field-effect transistor 19 whose channel shunts the emitter resistor 7 connecting the transistor 3 to a source of negative operating potential. Hence, when the channel is blocked and the FET is nonconducting, the effective biasing resistance for the emitter of transistor 3 is that of resistor 7. On the other hand, decreasing resistance of the channel correspondingly reduces the magnitude of the total biasing resistance and increases the oscillator gain. A rectifier diode 17 connects the emitter of transistor 15 to the junction between a load resistor 20 and a bias resistor 18, the latter being tied to the positive voltage-supply terminal. Across the resistor 20 I connect an indicator 21 which measures the rectified output of the oscillator and thereby indicates the distance of the metal part from its tank circuit 4. If desired, a trigger circuit 22 provided with a threshold device may also be connected across load resistor 20 and capacitor 16 to indicate the attainment of a predetermined distance and trigger a counter or the like as represented at 23. Details of such a trigger circuit have been described in my copending applications Ser. Nos. 79,741 and 80,016 filed Oct. 12 1970, and now abandoned as well as in respective continuations-in-part thereof, Ser. Nos. 290,868 and 290,866, filed concurrently with the present application.

It will be understood that, as with any feedback-operated corrective system, the rectified output voltage stored on capacitor 16 is affected by the control variable 107 of FIG. 1 (i.e., the amplification factor V) despite the compensatory effect of ancillary transistor 19 upon the loop gain. It is this residual variation which, in accordance with my invention, serves as a measure of the distance of a metallic element from the oscillator (specifically from its tank circuit 4). Thus, with coils 5 and 8 electromagnetically coupled as diagrammatically illustrated in FIG. 2, the proximity of a metallic element represented by arrow 107 lowers the Q of the tuned network 4, thereby reducing the effective collector resistance of transistor 3 so as to attenuate the oscillator output.

The oscillator shown in FIG. 2 could also be modified in various ways known per se, e.g., by being designed as a conventional Hartley oscillator.

I claim:

1. An electric contactless metal detector comprising:
an oscillator including a main transistor with an input circuit and an output circuit, said main transistor being operative to generate in said output circuit an oscillation of an amplitude affected by the proximity of a metallic element;
rectifier means in said output circuit;
biasing means in said input circuit for establishing an adjustable amplification factor for said main transistor, said biasing means including a resistor shunted by an ancillary transistor;
degenerative-feedback means connecting said rectifier means to said ancillary transistor for supplying thereto a rectified voltage of a magnitude depending upon the amplitude of said oscillation, thereby modifying said amplification factor in a sense compensating for changes in said amplitude due to the approach of a metallic element; and
indicator means connected to said output circuit for ascertaining residual changes in said amplitude as a measure of the distance of said metallic element from the oscillator.

2. A metal detector as defined in claim 1 wherein said indicator means is connected to said rectifier means for energization by said rectified voltage.

3. A metal detector as defined in claim 1 wherein said main transistor has a collector, an emitter and a base, said oscillator comprising a regenerative-feedback loop including inductance means connected to said base, said resistor being connected to said emitter.

4. A metal detector as defined in claim 3 wherein said rectifier means includes an emitter-follower transistor with a base capacitively coupled to said collector.

5. A metal detector as defined in claim 4 wherein said output circuit further comprises a storage capacitor connected to be charged through said emitter-follower transistor.

6. A metal detector as defined in claim 5 wherein said emitter-follower transistor has an emitter lead including a diode in series with said storage capacitor.

7. A metal detector as defined in claim 5 wherein said ancillary transistor is a field-effect transistor having a gate connected to said storage capacitor for energization by the charge thereof and further having a channel inserted, in parallel with said resistor, between the emitter of said main transistor and a source of operating potential therefor.

8. A metal detector as defined in claim 5 wherein said indicator means is connected across said storage capacitor.

* * * * *